United States Patent
Agerholm et al.

(10) Patent No.: US 7,093,008 B2
(45) Date of Patent: Aug. 15, 2006

(54) COMMUNICATION TECHNIQUES FOR SIMPLE NETWORK MANAGEMENT PROTOCOL

(75) Inventors: Alex O. Agerholm, Glostrup (DK); Kell Michael Jensen, Gentofte (DK)

(73) Assignee: Intel Corporation, Santa Clara, CA (US)

( * ) Notice: Subject to any disclaimer, the term of this patent is extended or adjusted under 35 U.S.C. 154(b) by 846 days.

(21) Appl. No.: 09/734,330

(22) Filed: Nov. 30, 2000

(65) Prior Publication Data

US 2002/0065908 A1 May 30, 2002

(51) Int. Cl.
*G06F 15/173* (2006.01)

(52) U.S. Cl. .............. 709/223; 709/224; 709/230; 709/246

(58) Field of Classification Search ........ 709/223–224, 709/231, 246, 230; 713/201; 714/4, 47–48; 370/401
See application file for complete search history.

(56) References Cited

U.S. PATENT DOCUMENTS

| | | | | |
|---|---|---|---|---|
| 6,008,805 A | * | 12/1999 | Land et al. | 715/744 |
| 6,073,165 A | * | 6/2000 | Narasimhan et al. | 709/206 |
| 6,182,157 B1 | * | 1/2001 | Schlener et al. | 719/318 |
| 6,385,644 B1 | * | 5/2002 | Devine et al. | 709/206 |
| 6,412,009 B1 | * | 6/2002 | Erickson et al. | 709/228 |
| 6,490,620 B1 | * | 12/2002 | Ditmer et al. | 709/224 |
| 6,496,859 B1 | * | 12/2002 | Roy et al. | 709/223 |
| 6,675,193 B1 | * | 1/2004 | Slavin et al. | 709/200 |
| 6,681,232 B1 | * | 1/2004 | Sistanizadeh et al. | 707/104.1 |
| 6,704,768 B1 | * | 3/2004 | Zombek et al. | 709/201 |
| 2001/0054064 A1 | * | 12/2001 | Kannan | 709/203 |

OTHER PUBLICATIONS

O'Guin, S. et al., "Application of virtual private networking technology to standards-based management protocols across heterogeneous firewall-protected networks", Military Communications Conf. Proc., IEEE, Oct. 31-Nov. 3, 1999, vol. 2, pp. 1251-1255.*
1 Security considerations for workflow systems☐☐Li, S.; Kittel, A.; Jia, D.; Zhuang, G.;☐☐Li, S., et al., "Security considerations for workflow systems", Network Operations and Management Symposium 2000, 2000 IEEE/IFIP, Apr. 10-14, 2000, pp. 655-668☐☐.*
O'Guin, S., et al., "Application of Virtual Private Networking Technology to Standards-Based Management Protocols Across Heterogeneous Firewall-Protected Networks", Military Communications Conf. Proc., IEEE, Oct. 31-Nov. 3, 1999, pp. 1251-1255.*

* cited by examiner

*Primary Examiner*—Frantz B. Jean
(74) *Attorney, Agent, or Firm*—Fish & Richardson P.C.

(57) ABSTRACT

Simple network management protocol or SNMP is encapsulated into HTTP traffic. The HTTP traffic is in a form that allows it to pass through a firewall. At one end, and SNMP request is encapsulated and sent to a remote computer. The remote computer de-encapsulates the request and responds to the SNMP request. The SNMP response is encapsulated as an HTTP response, and sent to the management station which interprets the results.

17 Claims, 2 Drawing Sheets

COMMUNICATION TECHNIQUES FOR SIMPLE NETWORK MANAGEMENT PROTOCOL

BACKGROUND

Simple network management protocol or SNMP is described in various RFCs, including SNMP v1 described in re RFC1155, Internet Engineering Task Force (IETF), 1997 and other flavors of SNMP including v2 and v3. SNMP can be used to exchange data between computers that indicates about network activity. The data travels between a number of managed computers/nodes and a network management station. A number of different network devices such as sub agents, master agents, and the like may also be managed using the SNMP protocol. The details of SNMP communications are well known in the art. The communications may produce a file, such as a MIPS file, that includes a textual data describing the network. The system often uses a polled interface which sends information to every item on the network, and receives information back.

SNMP is used by existing computer programs such as HP OpenView™.

BRIEF DESCRIPTION OF THE DRAWINGS

These and other aspects will now be described with reference to the accompanying drawings, in which.

DETAILED DESCRIPTION

Figure 1:
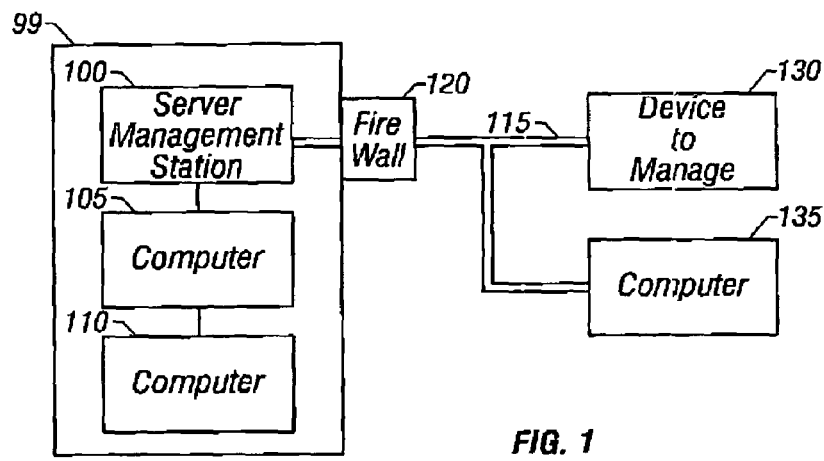
FIG. 1 shows a basic SNMP managed network.

FIG. 1 shows a basic network of the type contemplated according to the present system. A number of computers 100, 105, 110 are interconnected to one another over an intranet type network connection 99. One of these computers, here 100, is designated as the master, or in SNMP protocol, the network management system. The intranet 99 may also be connected to network components outside of the intranet 99 through an Internet 115. Such a connection is conventionally carried out via a firewall 120. The firewall 120 attempts to intercept and block all undesired or unknown traffic. Only information having certain characteristics is allowed to pass the firewall 120.

The internet may be the publicly-available "Internet", or a private gateway of any type, such as a dial-in gateway.

Parts of the network, such as computers 130 and 135, may be located on the Internet connection 115 and hence outside the firewall. However, a message that is in SNMP protocol may not be able to pass the firewall to monitor these computers. At the very least, a custom change of the firewall may be necessary. Moreover, in SNMP protocol version 3, a special socket called UDP is run which may make it difficult to set up the firewall for passage of SNMP protocol, even if this were desired.

Figure 2:
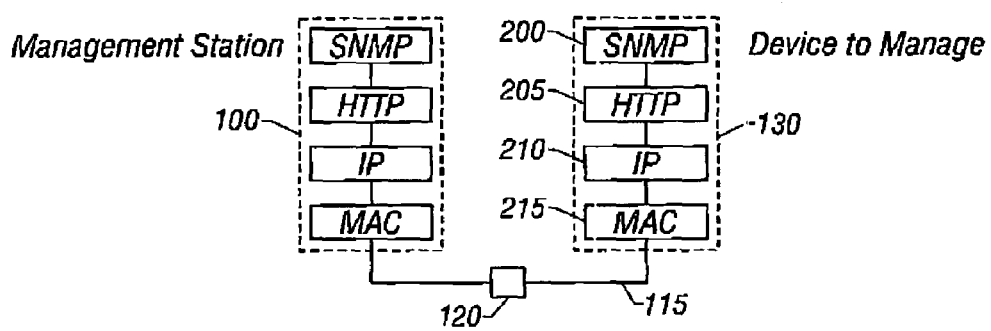
FIG. 2 shows a basic diagram of how the SNMP is encapsulated into HTTP.

This invention recognizes that virtually every firewall is configured to pass HTTP Internet traffic. Since the HTTP traffic can traverse the firewall, the present system defines encapsulating the SNMP Traffic into the HTTP Protocol. FIG. 2 shows the conceptual layout. The server 100 is shown on one side of the firewall 120. One of the managed devices 130 is shown on the other side of the firewall. The device to manage 130 creates SNMP information 200 which is basically textual information. Textual information is written as text within an HTTP sequence 205. All aspects of the sequence are interpreted as HTTP. The HTTP protocol is then formed into an Internet protocol, and sent via the MAC layer 215 to the Internet connection 115. The firewall 120 sees an HTTP protocol. Since HTTP traffic is almost always allowed through firewalls, the SNMP protocol is allowed to pass through the firewall 120 and is received by the management station 100.

Figure 3A:
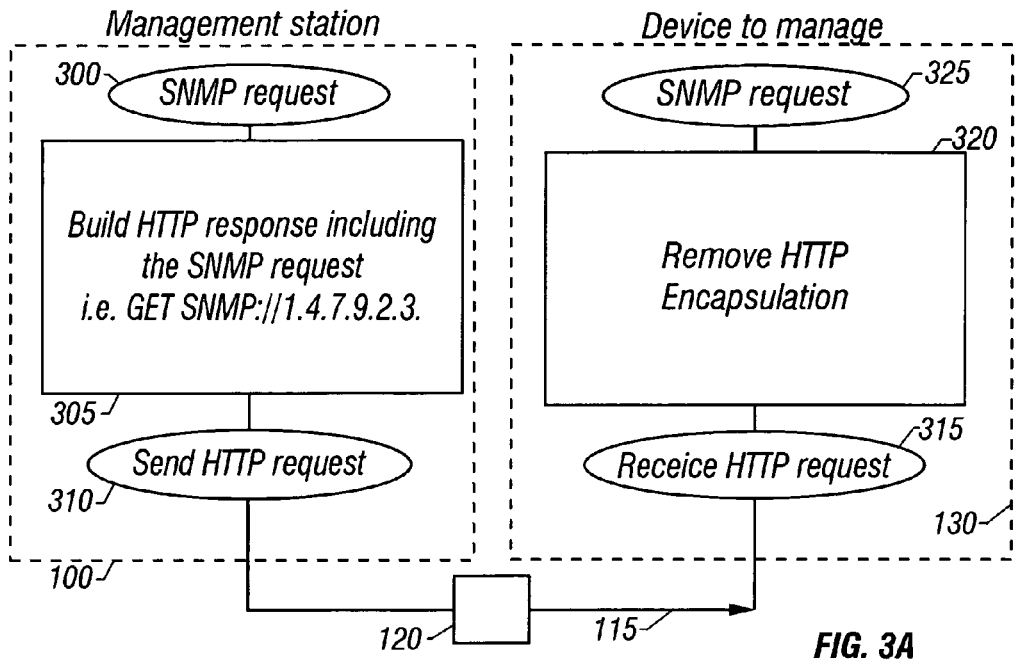
Figure 3B:
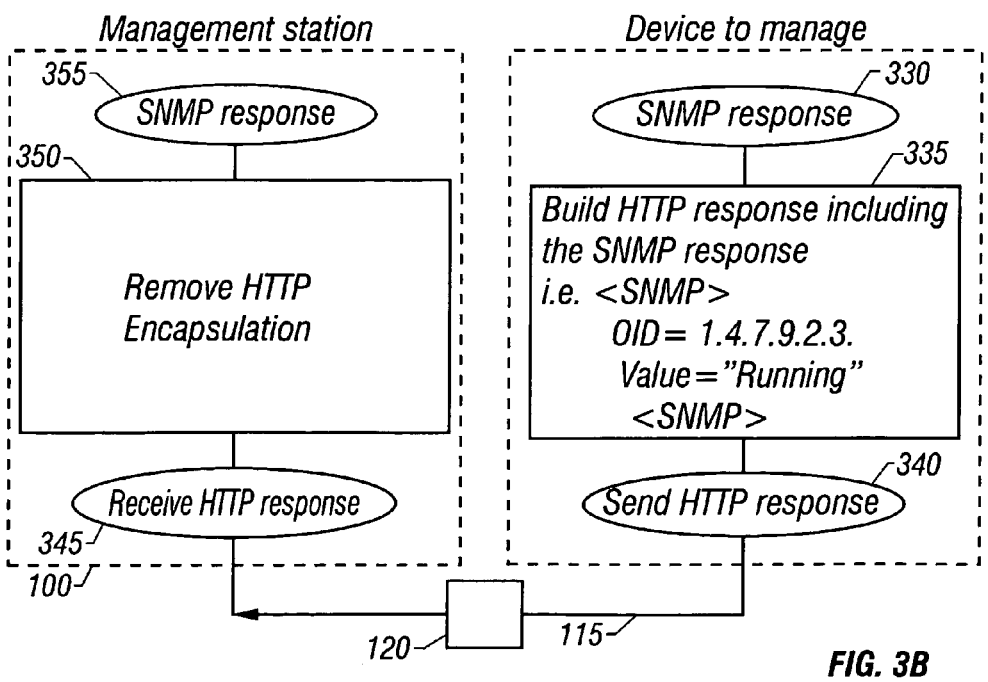

A more detailed flow diagram is shown in FIGS. 3A and 3B. FIG. 3A shows the management station sending the SNMP request. The SNMP request 300 is built as an HTTP sequence including the SNMP request. The text of the HTTP message can be, for example, GET SNMP://1.4.7.9.2.3 where the latter numbers are the numbers representing the managed device whose information is desired. At 310, the HTTP message is sent over the Internet connection 115 through the firewall 120. At 315, the managed station 130 receives the request, and removes the encapsulation at 320. This can produce the original text from the SNMP message. The SNMP request is therefore received at 325 by the standard SNMP program that monitors the requests.

FIG. 3B shows the SNMP program acting on the request received at 325 to produce a response. From the point of view of the SNMP program, this is a normal request in SNMP protocol. The response is sent to an encapsulator which at 335 builds an HTTP response including the SNMP response. A sample SNMP response would be as follows:

<SNMP>
OID=1.4.7.9.2.3
Value="Running"
<\SNMP>

Note that this includes tags <SNMP>, <\SNMP> which look like HTTP tags. These tags can be defined in a specific version of the HTTP, or else most browsers will interpret them as unknown tags and simply ignore the text in between them. However, since the SNMP information will likely never be read by a browser, defining these may be unnecessary. In any case, this sequence is sent as though it were an HTTP response at 340. Again, this is put onto the Internet connection 115, and passes the firewall 120 to be sent to the management station 100. Management station 100 receives the HTTP sequence at 345, and removes the encapsulation at 350. Once the encapsulation is removed, the SNMP response is handled at 355 exactly like any normal SNMP response would be handled.

Significant advantages of this system can be expected. Since the SNMP program can operate as normal, this system may be totally transparent to the SNMP program. In another embodiment, however, it may be the SNMP program itself that does the HTTP encapsulation.

Figure 4:
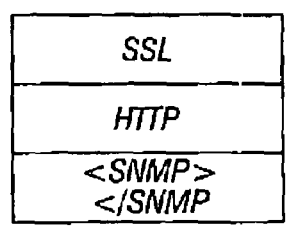
FIGS. 3A and 3B shows a flow diagram of the SNMP request through HTTP via the network and FIG. 4 shows encapsulating SNMP protocol into secure HTTP.

In another embodiment, shown in FIG. 4, the SNMP protocol is encapsulated using secure HTTP or HTTPs protocol. This provides a secure socket link (SSL) to the session, thereby providing security on the protocol. SSL can provide much higher security then any version of the SNMP. For example, the newest version of the SNMP V3 provides a maximum 56 bit key. HTTP can easily provide a 128 bit key.

This system can run in software on a computer as described herein, and also can run in hardware such as a field programmable gate array, digital signal processor or other hardware device.

In addition, while this system has been described for use with SNMP, this same technique can be used with other management schemes which have a message which will not pass a firewall. In any of these management schemes, the actual data can be encapsulated into HTTP and used to control the firewall.

Although only a few embodiments have been disclosed in detail above, other modifications are possible. All such modifications are intended to be encompassed within the following claims.

What is claimed is:

1. A method, comprising:
    obtaining, at a first node, information indicative of a network condition;
    encapsulating said information into an HTTP protocol; and
    sending said HTTP protocol to a network managing node.

2. A method as in claim 1, wherein said information is SNMP information.

3. A method as in claim 1, wherein said HTTP protocol is an HTTPs protocol.

4. A method as in claim 1, wherein said encapsulating comprises forming an HTTP message including said information therein.

5. A method as in claim 1, wherein said information is textual information, and wherein said encapsulating comprises forming an HTTP message including said textual information therein.

6. A method as in claim 5, wherein said HTTP message includes tags indicating SNMP information.

7. A system, comprising:
    a first, monitoring computer, to run a first program that monitors a network condition;
    a second, monitored computer, to run a second program which allows said first program to monitor the network condition;
    a connection between said first and second computers, said connection including a firewall which blocks at least a first kind of non-HTTP communications but does not block HTTP communications; and
    at least one of said first and second computers to run a third program that encapsulates network information indicative of the network condition into HTTP protocol.

8. A system as in claim 7 wherein said third program is part of one of said first and second programs.

9. A system as in claim 7 wherein said first and second programs each operate based on SNMP protocol.

10. A system as in claim 9, wherein said encapsulating comprises forming tags in the HTTP protocol which represent said SNMP protocol.

11. A system as in claim 7 wherein said HTTP protocol is HTTPs.

12. A method, comprising:
    forming an SNMP request for information from a remote computer, in a management station computer;
    changing said SNMP request to a form which will be passed by a firewall, wherein said changed SNMP request is encapsulated into HTTP protocol; and
    sending said changed SNMP request to said remote computer through said firewall.

13. A method as in claim 12, wherein said HTTP protocol includes a secure socket layer.

14. A method as in claim 12, wherein said changed SNMP request includes tags in a style usually used by said HTTP protocol.

15. A method as in claim 12 further comprising:
    receiving said changed SNMP request in said remote computer; and
    changing said changed SNMP request into a standard SNMP request.

16. A method as in claim 15, further comprising:
    in said remote computer, preparing an SNMP response;
    encapsulating said SNMP response as a changed SNMP response; and
    sending said changed SNMP response through said firewall to said management station computer.

17. A method as in claim 16 further comprising, at said management station computer, changing said changed SNMP response to a standard SNMP response.

* * * * *